United States Patent Office 3,323,264
Patented June 6, 1967

3,323,264
DRYWALL CORNER CONSTRUCTION WITH CORNER BEAD
Richard G. Cross, Weston, Ontario, Canada, assignor to Beadex Drywall Specialties Ltd., Rexdale, Ontario, Canada
Filed Jan. 22, 1965, Ser. No. 427,269
1 Claim. (Cl. 52—281)

ABSTRACT OF THE DISCLOSURE

A corner bead for dry wall construction comprising a unitary member having a pair of legs in substantially perpendicular relation to each other, and a single ply corner section joining said legs. Means are provided on one of the legs for attaching the bead to a wallboard and comprises a pair of tongues partially severed from one leg and adapted to clamp the wallboard between such tongues and the other leg.

---

It is well known to form corners in drywall construction by placing a metallic corner bear at the junction of the two boards forming the corner. The corner bead has two longitudinally extending flat legs and a slightly protruding arcuate bead portion. The legs are attached to the wallboards by nailing, and the bead and joint covered by a layer of plaster or mastic laid flush with the protruding arcuate bead portion.

It has been realized that the requirement that the corner bead be nailed to the wallboards is time-consuming and hence undesirable and an alternative form of corner bead which adheres to the wallboards by means of a paper flange bonded to metallic legs of the bead has been proposed.

It is, therefore, an object of this invention to provide a corner bead structure which can be rapidly attached to a wallboard without the necessity of nailing or gluing.

The corner bead structure according to this invention comprises two longitudinally extending legs connected by a slightly protruding arcuate bead portion. Clamping members are formed from segments partially detached from one of the legs and bent into a position parallel to or converging towards the other leg. The corner bead can then be attached to a wallboard in such a manner that the board is gripped between the clamping members and the leg extending parallel to the clamping members.

Figure 1:
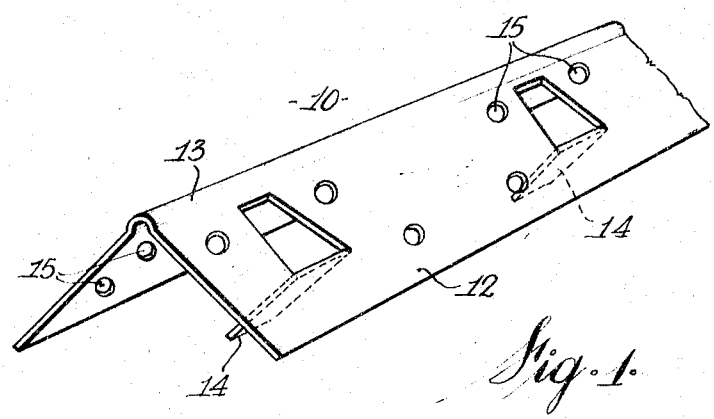
Figure 2:
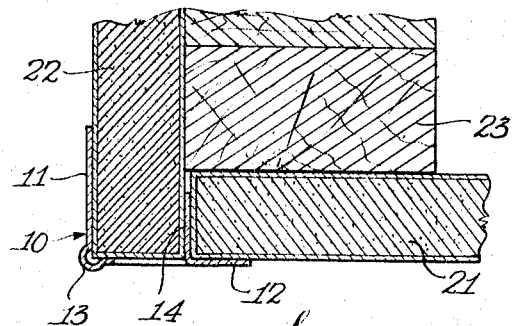

Other features and objects of this invention will become apparent from the following description taken in conjunction with the accompanying drawing, in which FIGURE 1 is an isometric view of the corner bead structure of this invention, and FIGURE 2 is a cross-sectional view of a corner of drywall construction using the corner bead structure of this invention.

Referring to FIGURE 1, the corner bead of this invention, indicated generally at 10, consists of two legs 11 and 12 joined by an outwardly bulging arcuate section 13. Legs 11 and 12 are disposed substantially perpendicular to each other. Clamping members 14 are formed from sections or tongues 14 cut from leg 12 and bent into generally parallel or somewhat converging relationship with leg 11.

In the corner assembly shown in FIGURE 2 two wallboards 21 and 22 are shown in position abutting against a corner stud 23. Corner bead 10 is supported in position by wall board 22 which is gripped between leg 11 and clamping member 14. A portion of leg 12 extends along the surface of wall board 21.

Plaster or drywall joint filling compound is then applied over the corner bead 10 in conventional manner, to form a smooth surface flush with the arcuate portion 13. Holes 15 are provided in legs 11 and 12 of corner bead 10 so that the joint filling compound penetrates through the holes to the surfaces of boards 21 and 22 and causes the bead to adhere securely to the wallboards.

Thus, there has been disclosed a corner bead for drywall construction which can easily and rapidly be clamped on to a wall board forming part of a corner assembly. While the corner bead which has been disclosed is adapted for a right angled corner, it will be readily apparent that corners of different angles may be formed so long as the clamping member 14 is maintained parallel to or converging towards the opposed leg 11.

I claim:

In combination with a drywall construction having a corner stud and a pair of wallboards fixed to said stud, each said wallboard having an inner side surface engaging said stud, a first one of said wallboards having outer side and end surfaces defining a corner, the second one of said wallboards having an outer side surface substantially in the plane of said first wallboard end surface and an end surface adjoining said first wallboard end surface, a corner bead comprising (a) a unitary member of sheet material having,
(b) a first leg in engagement with said first wallboard outer side surface,
(c) a second leg in engagement with said first wallboard end surface and said second wallboard outer side surface,
(d) a single ply corner section jointing said legs, and
(e) means for retaining said member in engagement with said wallboard surfaces comprising a plurality of clamping tongues integral with and severed from said second leg,
(f) each said tongue forming an opening in said first leg and having a hinge connection with said second leg defining one edge portion of said opening,
(g) said opening edge portion being parallel to said corner section and being more remote therefrom than the remaining edge portions of said opening,
(h) each said tongue engaging said first wallboard inner side surface and said second wallboard end surface and terminating in spaced relation to said stud.

References Cited
UNITED STATES PATENTS

| | | | |
|---|---|---|---|
| 1,938,474 | 12/1933 | Wilhoyte | 52—256 |
| 2,311,345 | 2/1943 | Mitchell | 52—255 |
| 2,862,264 | 12/1958 | Perna | 52—288 |
| 3,038,276 | 6/1962 | Butler | 52—256 X |
| 3,255,561 | 6/1966 | Cable | 52—288 X |

FRANK L. ABBOTT, *Primary Examiner.*
R. S. VERMUT, *Assistant Examiner.*